United States Patent
Walker et al.

(10) Patent No.: US 8,669,844 B2
(45) Date of Patent: Mar. 11, 2014

(54) RADIO FREQUENCY IDENTIFICATION (RFID) SYSTEM PROVIDING MEETING ROOM RESERVATION AND SCHEDULING FEATURES AND RELATED METHODS

(75) Inventors: David Ryan Walker, Waterloo (CA); Scott Douglas Rose, Waterloo (CA); Vahid Moosavi, Kitchener (CA); Jason Tyler Griffin, Kitchener (CA); Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 476 days.

(21) Appl. No.: 12/888,632

(22) Filed: Sep. 23, 2010

(65) Prior Publication Data

US 2012/0075068 A1 Mar. 29, 2012

(51) Int. Cl.
*G06Q 10/00* (2012.01)

(52) U.S. Cl.
USPC ......... 340/6.1; 340/5.1; 340/10.1; 340/13.26; 705/5; 705/7.12; 705/7.13; 705/7.15; 705/7.18; 705/7.19; 705/7.22; 705/7.24

(58) Field of Classification Search
USPC ........... 340/5.2, 6.1, 10.1, 13.26; 705/5, 7.12, 705/7.13, 7.15, 7.18, 7.19, 7.22, 7.24
See application file for complete search history.

(56) References Cited

U.S. PATENT DOCUMENTS

| | | | |
|---|---|---|---|
| 2004/0267623 A1* | 12/2004 | Vivadelli et al. | 705/26 |
| 2007/0162315 A1* | 7/2007 | Hodges | 705/8 |
| 2007/0288291 A1* | 12/2007 | Earle | 705/9 |
| 2008/0014966 A1 | 1/2008 | Chakraborty et al. | 455/456.4 |
| 2008/0084860 A1 | 4/2008 | Bloebaum et al. | 370/342 |
| 2008/0244417 A1* | 10/2008 | Simpson et al. | 715/751 |
| 2009/0265280 A1* | 10/2009 | Taneja et al. | 705/80 |
| 2010/0017245 A1* | 1/2010 | Kristiansen et al. | 705/8 |

OTHER PUBLICATIONS

"Statement in accordance with the notice from the European Patent Office dated Oct. 1, 2007 concerning business methods-EPC", Nov. 2007, p. 1.
Visix, MeetingMinder Room Signs: www.visix.com/meeting_minder.html Printed Feb. 22, 2010.
RoomWizard; Manage your meeting rooms with Digital Signs: http://www.saville-av.com/digitalsignage/roomwizard-room-management.htm Printed: Nov. 16,2010.
ACT-412A—Access Control Terminal http://ipc2u.com/news/ACT-412A.html Feb. 23, 2010.
U.S. Appl. No. 12/888,813, filed Sep. 23, 2010, Adams et al.

* cited by examiner

*Primary Examiner* — Andrew Bee
(74) *Attorney, Agent, or Firm* — Allen, Dyer, Doppelt, Milbrath & Gilchrist, P.A.

(57) ABSTRACT

A meeting room reservation system may include at least one radio frequency identification (RFID) sensor to be positioned adjacent a meeting room, and a plurality of mobile wireless communications devices, each configured for RFID communication with the at least one RFID sensor. The system may further include a reservation server configured to schedule reserved starting and ending times for the meeting room, track checked-in mobile wireless communications devices based upon RFID communication with the at least one RFID sensor, and send at least one reservation expiration notification based upon a reserved ending time and a subsequent check-in of another mobile wireless communications device.

30 Claims, 6 Drawing Sheets

RADIO FREQUENCY IDENTIFICATION (RFID) SYSTEM PROVIDING MEETING ROOM RESERVATION AND SCHEDULING FEATURES AND RELATED METHODS

TECHNICAL FIELD

This application relates to the field of communications, and more particularly, to radio frequency identification (RFID) system and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

With NFC technology becoming more widely adopted, it is now used with portable wireless communications devices in association with other short-range wireless communications, such as a wireless BlueTooth connection. For example, an NFC connection is often used to establish a wireless BlueTooth connection in which data for establishing the BlueTooth connection is initially communicated.

DETAILED DESCRIPTION

Figure 1:
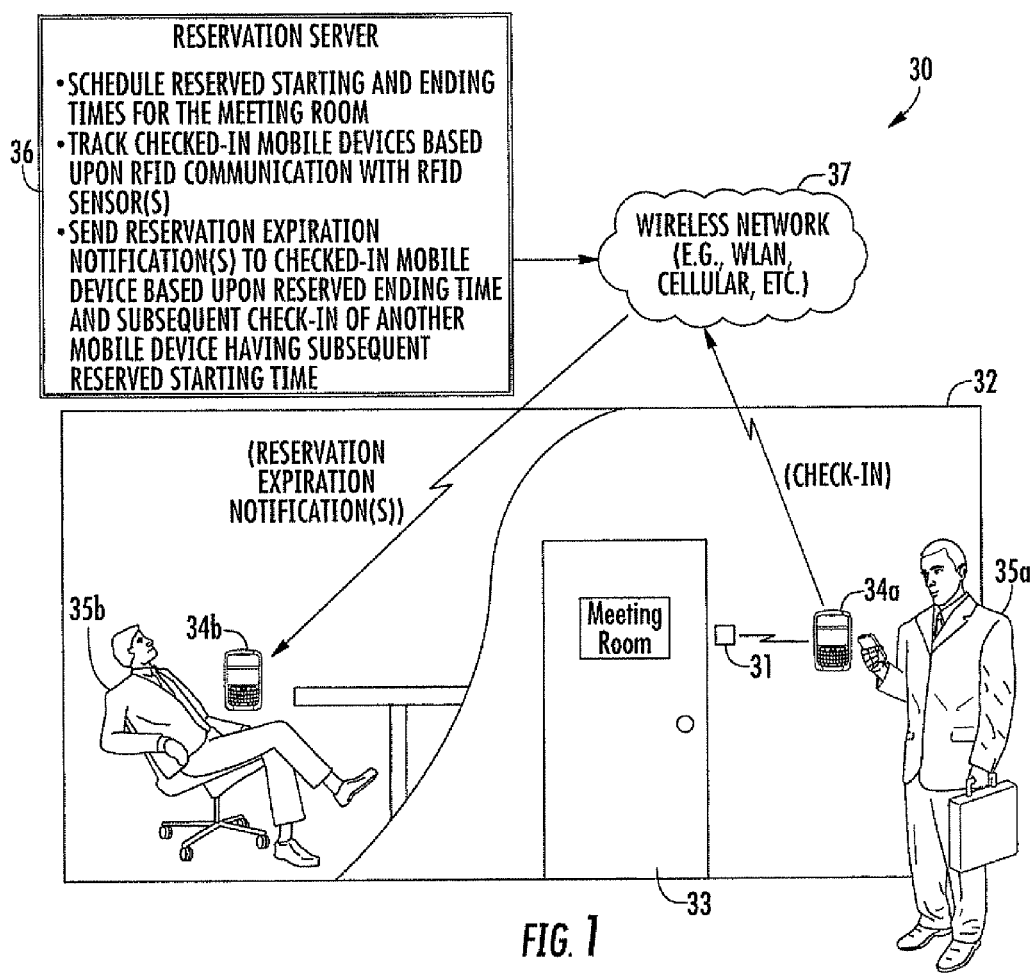
FIG. 1 is a schematic block diagram of a meeting room reservation system in accordance with an example embodiment.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a meeting room reservation system is provided which may include at least one radio frequency identification (RFID) sensor to be positioned adjacent a meeting room, and a plurality of mobile wireless communications devices, each configured for RFID communication with the at least one RFID sensor. The system may further include a reservation server configured to schedule reserved starting and ending times for the meeting room, track checked-in mobile wireless communications devices based upon RFID communication with the at least one RFID sensor, and send at least one reservation expiration notification based upon a reserved ending time and a subsequent check-in of another mobile wireless communications device having a subsequent reserved starting time. Accordingly, the system advantageously allows reminder messages to be discretely sent to mobile wireless communications devices of occupants currently in a meeting room without the need for interruption or confrontation by those waiting to enter the meeting room for a subsequent meeting.

More particularly, the reservation server may be configured to send the at least one reservation expiration notification within a threshold period of the reserved ending time. The reservation server may also be configured to send a plurality of reservation expiration notifications at an increasing frequency. Also, the reservation server may be configured to schedule the reserved starting and ending times via RFID communication between the mobile wireless communications devices and the at least one RFID sensor. Additionally, the reservation server may be further configured to cancel reserved starting and ending times based upon a failure of at least one mobile wireless communications device to check in.

The meeting room reservation system may further include a terminal to be positioned in the meeting room. As such, the reservation server may be further configured to send the at least one reservation expiration notification to the terminal. By way of example, the terminal may comprise a display, and the display may be configured to display the at least on reservation expiration notification. In addition, the terminal and the reservation sever may communicate via a local area network (LAN). The at least one RFID sensor may comprise at least one NFC sensor, for example. In addition, the at least one reservation expiration notification may comprise at least one electronic mail (email) notification. In addition, the reservation server may further be configured to send an availability notification to the other mobile wireless communications device based upon checkout of the checked-in mobile wireless communications device.

A related resource reservation system may include at least one RFID sensor to be positioned adjacent the resource, a plurality of mobile wireless communications devices, each configured for RFID communication with the at least one RFID sensor, and a reservation server. The reservation server may be configured to schedule reserved starting and ending times for the resource, track checked-in mobile wireless communications devices based upon RFID communication with the at least one RFID sensor, and send at least one reservation expiration notification based upon a reserved ending time and a subsequent check-in of another mobile wireless communications device.

A reservation server is also provided for use with at least one RFID sensor to be positioned adjacent a meeting room and a plurality of mobile wireless communications devices each configured for RFID communication with the at least one RFID sensor. The reservation server may include a scheduling module configured to schedule reserved starting and ending times for the meeting room, and a check-in module configured to track checked-in mobile wireless communications devices based upon RFID communication with the at least one RFID sensor. The scheduling module may be further configured to send at least one reservation expiration notification based upon a reserved ending time and a subsequent check-in of another mobile wireless communications device.

A meeting room reservation method may include scheduling reserved starting and ending times for a meeting room with a reservation server, and tracking checked-in mobile wireless communications devices with the reservation server based upon radio frequency identification (RFID) communication between the mobile wireless communications devices and at least one RFID sensor positioned adjacent the meeting room. The method may also include sending at least one reservation expiration notification based upon a reserved ending time and a subsequent check-in of another mobile wireless communications device.

Referring initially to FIG. 1, a meeting room reservation system 30 in accordance with one example aspect is first described. Generally speaking, scheduling and sharing of meeting rooms may be a source of frustration. For example, one potential problem associated with shared conference rooms may include walking into the wrong meeting and causing an interruption (or embarrassment). Another potential problem is that some users may overrun their allotted time, so that subsequent users have to stand at the door and wait or interrupt and potentially cause a confrontation. Still another potential problem is that users may show up late for their scheduled meeting, which may cause a confrontation with others who began using the room thinking that the prior meeting was cancelled, for example. The system 30 may advantageously help alleviate such problems.

More particularly, the system 30 illustratively includes one or more radio frequency identification (RFID) sensors 31 to be positioned adjacent a meeting room 32. In the illustrated example, the RFID sensor 31 is positioned next to a door 33 of the meeting room 32, although it may be positioned on the door or elsewhere. The system 30 further illustratively includes a plurality of mobile wireless communications devices 34a, 34b (also referred to as "mobile devices" herein), which are associated with respective users 35a, 35b. In the present example, the mobile device 34b is associated with a meeting currently in progress, while the mobile device 34a is associated with a subsequently scheduled meeting.

The mobile devices 34a, 34b are configured for RFID communication with the RFID sensor 31. For example, the RFID sensor 31 may be a near field communication (NFC) sensor, and the mobile devices 34a, 34b may communicate with the NFC sensor via NFC communications. NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The mobile devices 34a, 34b may further include additional wireless capabilities beyond RFID or NFC in some embodiments, such as cellular, wireless LAN (e.g., Blue-Tooth, 802.11x, etc.), WiMAX, etc. Example mobile devices may include portable or personal media players (e.g., MP3 players, video players, etc.), portable gaming devices, portable or mobile telephones, smart phones, etc.

Figure 4:
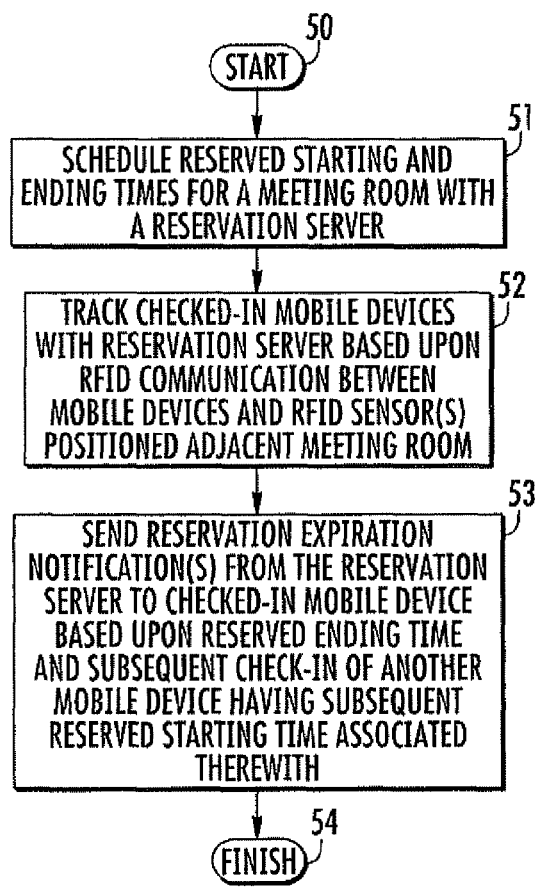
FIG. 4 is a flow diagram illustrating method aspects associated with the systems of FIGS. 1 and 2.

Referring additionally to FIG. 4, beginning at Block 50, the system 30 further illustratively includes a reservation server 36 configured to schedule reserved starting and ending times for the meeting room 32, at Block 51. For example, one way in which rooms may be scheduled is to log onto the reservation server 36 via a LAN, Internet, etc., such as through a computer using a graphical interface (e.g., Web browser, etc.) which interfaces with a database application on the reservation server that is configured to store and retrieve meeting reservation information (e.g., room identification (ID), start times, ending times, etc.). One example application which may be configured on the reservation server 36 to perform the meeting reservation functions described herein is Microsoft® Exchange Server, although other suitable applications may also be used in different embodiments.

The reservation server 36 may also schedule starting and ending times based upon RFID communication between respective mobile devices 34a, 34b and the RFID sensor 31. That is, upon scanning the RFID sensor 31, a reservation application running on a given mobile device 34 may communicate an ID of the RFID sensor 31 to the reservation server 36 via the wireless network 37. The reservation server 36 may then cooperate with the reservation application to determine and reserve available starting and ending times for a meeting in the meeting room 32, and associate the given mobile device 34 with the reservation in the database. The reservation server 36 may schedule multiple meeting rooms in some embodiments, and the ID of the RFID sensor 31 associated with a given meeting room may therefore be used by the reservation server to identify the given meeting room from among the other rooms.

When the reserved starting time for a meeting arrives, the given mobile device 34 is scanned or swiped with, or otherwise brought in range of, the RFID sensor 31 to "check-in" for the meeting. That is, upon swiping of a given mobile device 34, the reservation application communicates with the reservation server 36 via the wireless network 37, so the reservation server may track that the given mobile device 34 is checked-in for the reserved start time, at Block 52. In the illustrated example, the mobile device 34b has previously been checked in for a meeting currently in progress, while the mobile device 34a is being checked in for a subsequently scheduled meeting.

To help address the above-described problems associated with shared meeting rooms, the reservation server 36 may also advantageously send one or more reservation expiration notifications to the checked-in mobile device 34b based upon its reserved ending time and a subsequent check-in of the mobile device 34a having a subsequent reserved starting time, at Block 53, which concludes the method illustrated in FIG. 4 (Block 54), although this process would typically repeat in an actual implementation. Accordingly, the system 30 advantageously allows reminder messages to be discreetly sent to the mobile device 34b or user message account without the need for interruption or confrontation by the user 35a who is waiting to enter the meeting room 32.

By way of example, the reservation expiration notifications may take the form of electronic messages, such as electronic mail (email), SMS, MMS, etc., which are sent to the mobile device 34b or user message account via the wireless network 37. Other forms of reservation expiration notifications may also be used, such as audible alerts (e.g., an alarm sound, spoken reminder, etc.), a vibration alert (i.e., the notification causes the mobile device 34b to vibrate), or simply a visual indication (e.g., reminder message, countdown clock, etc.) that appears on a display of the mobile device.

Figure 3:
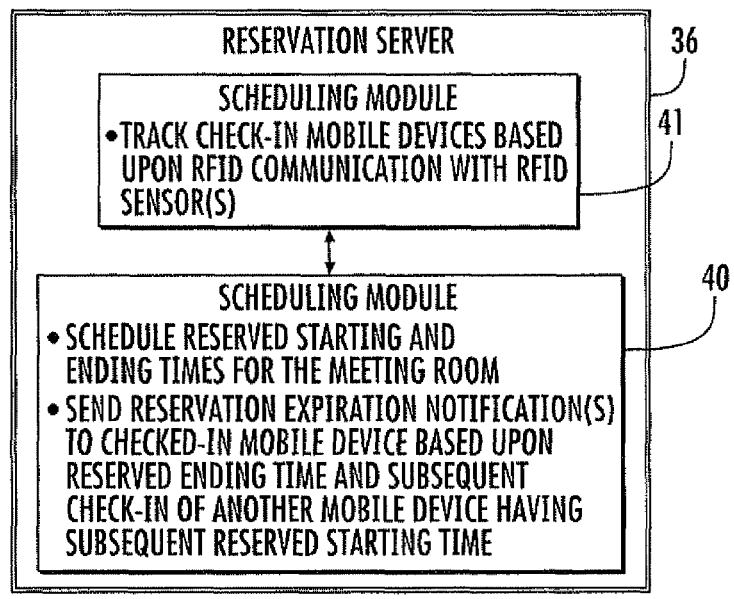
FIG. 3 is a schematic block diagram illustrating an example embodiment of the reservation server of the system of FIG. 1 in greater detail.

In the example embodiment illustrated in FIG. 3, the reservation server 36 illustratively includes a scheduling module 40 configured to schedule reserved starting and ending times and send reservation expiration notifications, as well as a check-in module 41 configured to track checked-in mobile devices 34, as discussed further above. The scheduling module 40 and check-in module 41 may be implemented using hardware (e.g., processor, memory, etc.) and/or software (i.e., computer-executable instructions embodied in a physical, tangible, non-transitory medium) components, for example. Other module configurations are also possible in different embodiments.

Figure 5A:
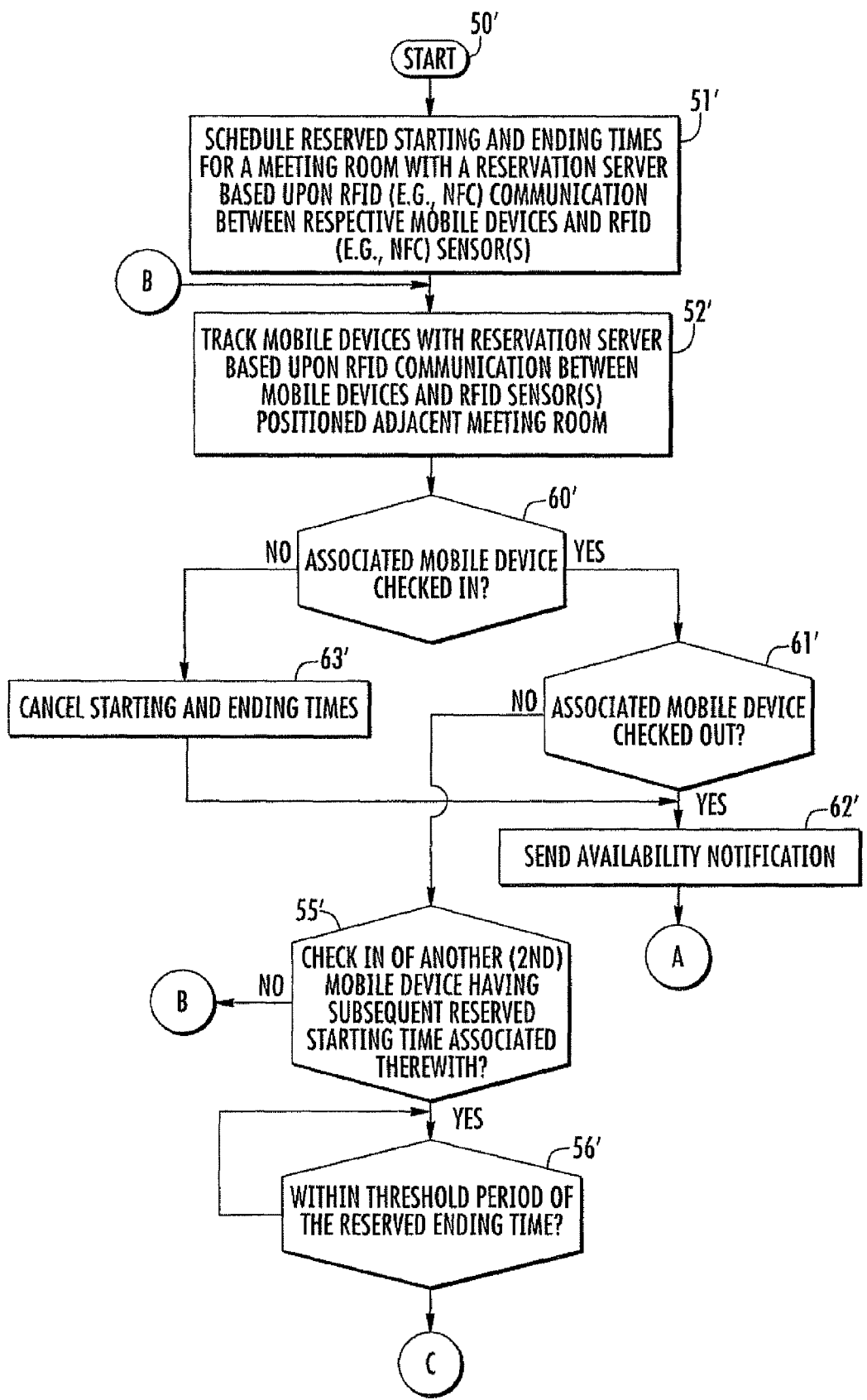
FIG. 5. Is another flow diagram illustrating further method aspects associated with the systems of FIGS. 1 and 2.
Figure 5B:
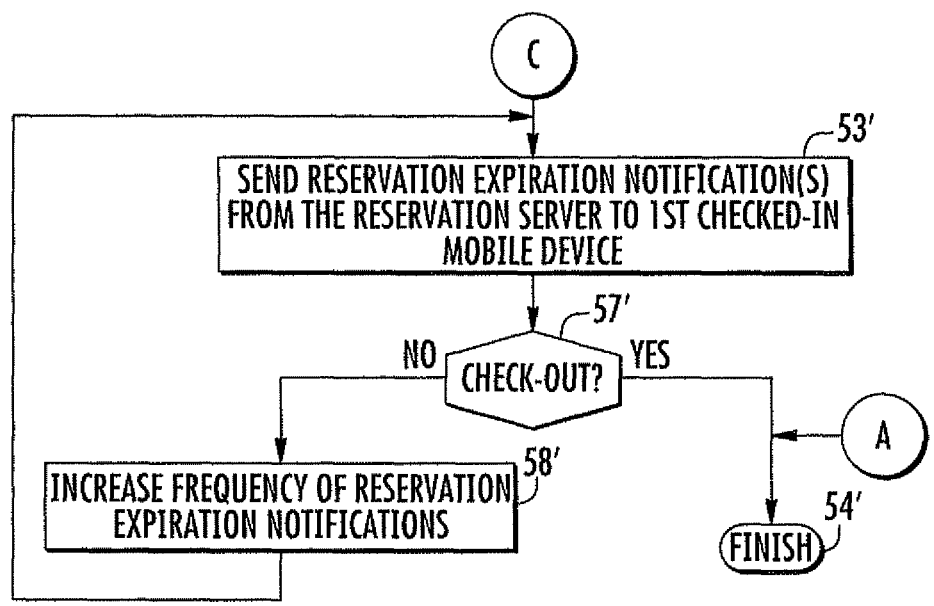

Referring additionally to FIG. 5, the reservation server 36 may be further configured to send the reservation expiration notification (or begin sending a series of notifications) within a threshold period of the reserved ending time, at Block 56'. That is, if the second mobile device 34a associated with the upcoming or subsequent meeting has checked in (Block 55'), and the current time is within a threshold period of the reserved starting time for the upcoming meeting (e.g., ten or fewer minutes before the starting time), then sending of the reservation expiration notification(s) may begin (Block 53'). Other threshold periods may also be used in different embodiments. In this way, if the mobile device 34a is checked-in well before the reserved starting time for its associated meeting (e.g., thirty minutes prior to its reserved meeting time), the mobile device 34b will not begin to receive the reservation expiration notification(s) until a reasonable threshold period before its associated reserved ending time (e.g., ten minutes before).

The reservation server 36 may also be configured to send a plurality of reservation expiration notifications at an increasing frequency, for example, if the mobile device 34b does not check out of the meeting room 32 by scanning or swiping the RFID sensor 31, such as upon exiting the meeting room, at Blocks 57'-58'. So, for example, the reservation server 36 may send reservation expiration notifications at ten minutes, five minutes, two minutes, one minute, and thirty seconds prior to the reserved ending time, and then at the ending time and continuing thereafter until the mobile device 34b is checked out of the meeting room 32 via the RFID sensor 31. Other frequencies or schedules for sending multiple reservation expiration notifications may also be used in different embodiments.

Additionally, the reservation server 36 may be further configured to cancel reserved starting and ending times based upon a failure of an associated mobile device 34 to check in (Block 52'). Thus, for example, if the reserved starting and ending times associated with the mobile device 34b were 10:00 AM and 11:00 AM, respectively, if this mobile device had not been checked in by 10:30 AM, for example, then the reservation server 36 may advantageously cancel the reservation (i.e., cancel the reserved 10:00 AM and 11:00 AM starting and ending times, respectively). Other periods of time may be used for determining the cancellation point besides half-hour increments. Another option is to send a message to the mobile device 34 or user message account that failed to check-in requesting confirmation to cancel the reservation prior to canceling the reservation.

Similarly, if the mobile device 34b has checked in (Block 60') but then checks out from the meeting room 32 prior to the scheduled ending time (i.e., indicating that the scheduled meeting finished early), at Block 61', then the mobile device 34a or user message account may be notified accordingly that the meeting room is available, at Block 62', even prior to checking in at the RFID sensor 31 (Block 55'). This feature may advantageously be used to alert the next occupant that the meeting room 32 is available prior to the scheduled start time (which may allow for setup prior to the next meeting, etc.). The reservation server 36 may also free up the remainder of the time slot in the event that a subsequent meeting is not already scheduled. Of course, if the mobile device 34b fails to check in for its scheduled meeting, then the scheduled starting and ending times for its associated reservation may be cancelled, at Block 63', and the mobile device 34a or user message account may again be notified accordingly that the meeting room 32 is available early (Block 62').

Figure 2:
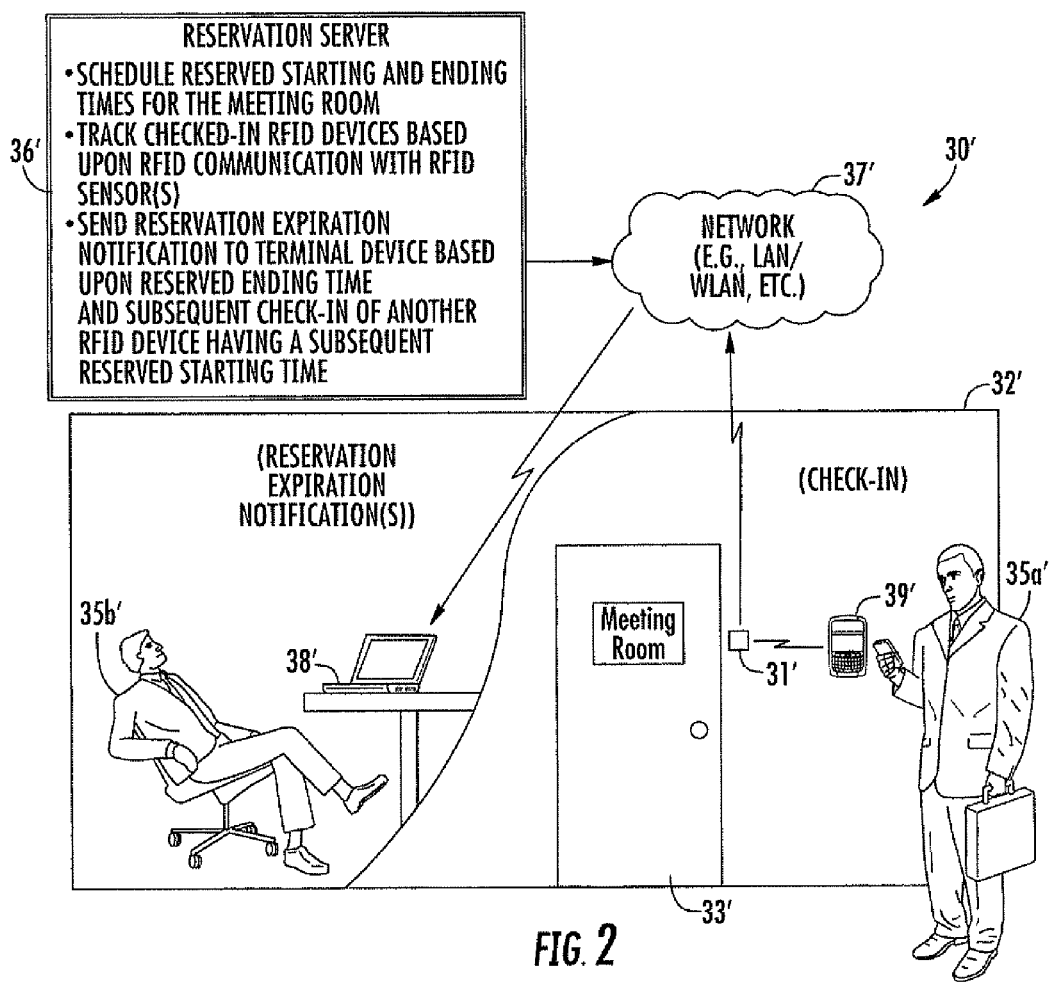
FIG. 2 is a schematic block diagram of an alternative embodiment of the meeting room reservation system of FIG. 1.

Another example meeting room reservation system 30' is now discussed with reference to FIG. 2. In this embodiment, a terminal 38' is positioned in the meeting room 32', and RFID devices 39' are associated with respective users 35' and are each configured for RFID communication with the RFID sensor 31'. As such, the reservation server 36' may be configured to track checked-in RFID devices 39' based upon RFID communication with the RFID sensor 31', and send reservation expiration notifications to the terminal 38' as similarly discussed above. That is, in the present example the reservation expiration notification(s) may advantageously be provided to the terminal 38', which remains in the meeting room 32'. In the illustrated example, the terminal 38' (here a laptop computer) includes a display, and the reservation expiration notification takes the form of a countdown clock shown on the display which indicates how much time is left before the reserved ending time for the meeting (one minute, thirty-five seconds in the example).

While the RFID device 39' may also include cellular, WLAN, etc., capabilities in some embodiments, the RFID device may simply take the form of a substrate (e.g., key card) with an embedded RFID (e.g., NFC) circuit, for example. In such case, the RFID sensor 31' may communicate with the reservation server 36' via a wired or wireless LAN, cellular communications link, etc., so that the reservation server may perform the above described functions. Various forms of terminals 38' may be used, such as an audio terminal (e.g., a speakerphone located in the meeting room 32', etc.), monitors or projectors, etc. It should be noted that while the systems 30 and 30' are shown separately for clarity of illustration, the various components thereof may be used together in some applications. For example, both mobile devices 34 and RFID devices 39' (e.g., RFID key cards) may both be used in some embodiments, and reservation expiration notifications may be sent to mobile devices 34 as well as the terminal 38' in the meeting room 32', if desired.

Various scheduling and conflict resolution features of the above described systems and methods will be further understood with reference to example use cases thereof. If the functions of the reservation server are implemented using Microsoft® Exchange Server, the RFID sensor 31 provides an ID of the given meeting room which is sent to the Exchange server (either directly via a LAN, etc., or through the mobile device 34a). If the mobile device 34a (or RFID device 39') is booked into the meeting room 32, or will be in the next ten minutes, the reservation server 36 may assume that the meeting room is still occupied from the previous meeting (i.e., the meeting currently in progress) and send a reservation expiration notice to the mobile device 34b, terminal 38', etc., indicating that the next meeting attendees are waiting outside the door 33. Multiple taps or swipes of the mobile device 34a or RFID device 39' in some embodiments may cause the reservation server 36 to make the notifications to the organizer more exaggerated (e.g., bold lettering, flashing text, louder volume, increased frequency, etc.).

If the mobile device 34a or RFID device 39' has not booked (i.e., has not reserved) the meeting room 32 for the upcoming meeting period, the reservation server 36 may be configured to respond with the schedule for the day and, if the meeting room is free at that moment (or in the near future), ask if a reservation is desired at the available free time(s). Alternatively, if the mobile device 34a or RFID device 39' is associated with an upcoming reservation, but has swiped the RFID sensor 31 for the wrong meeting room, then the reservation server 36 may indicate to the mobile device, or to a terminal located outside the meeting room, etc., that the reservation associated therewith is for a different room and optionally provide directions on how to get to the correct meeting room.

Example notifications that may be provided upon checking in with the RFID sensor 31 may include, for example, that the meeting room 32 is not reserved and is available (i.e., unoccupied). Another example is that the meeting room is not reserved but occupied (an option may be provided to notify the users within the meeting room that it is time to leave). Still another example is that the meeting room is booked, but not occupied (an option may be provided to inquire of the user holding the reservation if that reservation may be cancelled, as noted above). Yet another example is that the meeting room is reserved and occupied. In the latter example meeting room state, the above-noted reservation expiration notification process may begin at the appropriate point prior to the reserved ending time if a reservation for a subsequent meeting exists, or the available schedule may be provided with an option to make a later reservation, as noted above.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
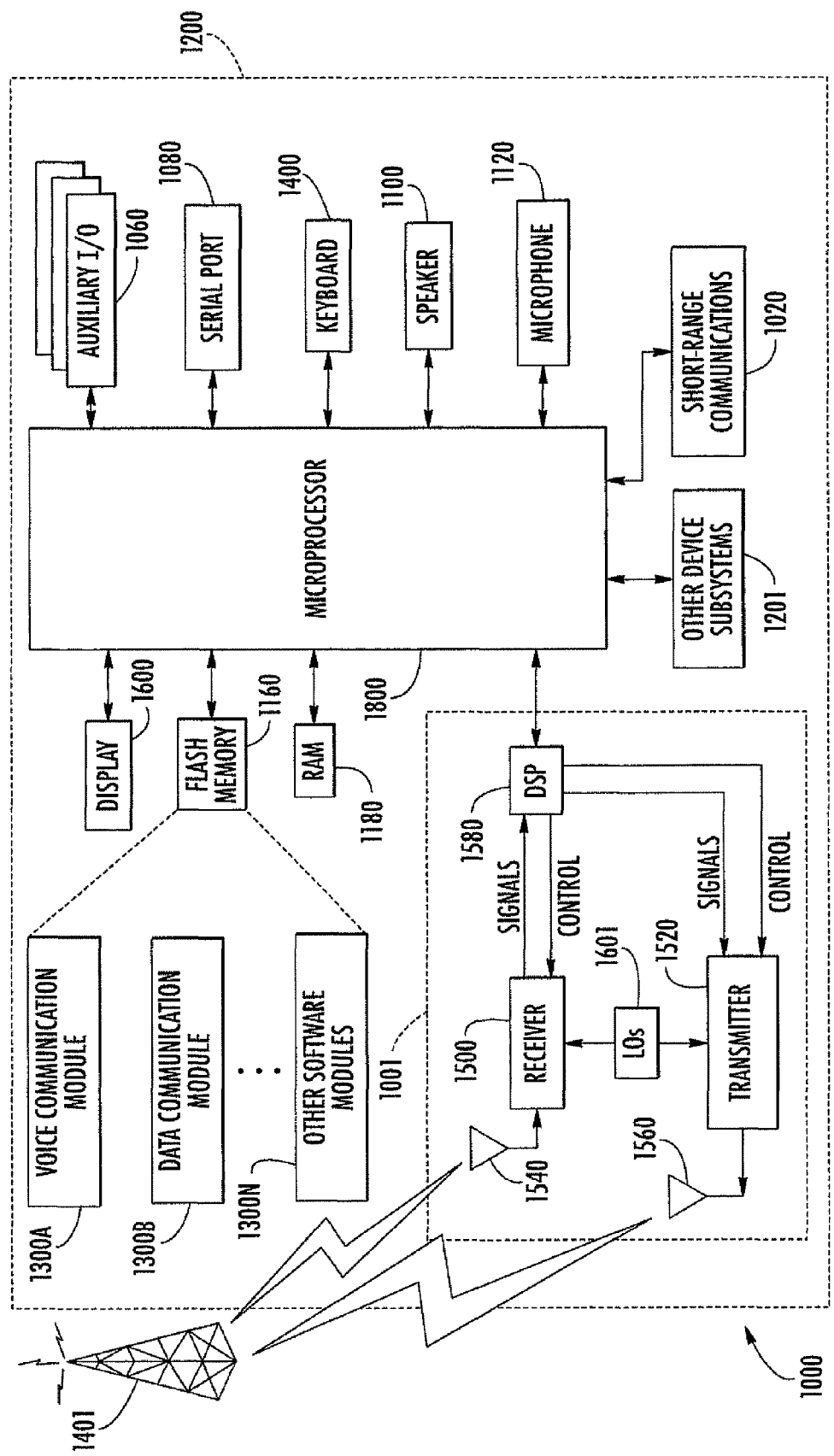
FIG. 6 is a schematic block diagram illustrating example components of a mobile wireless communications device that may be used with the systems of FIGS. 1 and 2.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a BlueTooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A meeting room reservation system comprising:
   at least one radio frequency identification (RFID) sensor to be associated with a meeting room;
   a plurality of mobile wireless communications devices, each configured for RFID communication with said at least one RFID sensor; and
   a reservation server configured to
   schedule reserved starting and ending times for the meeting room,
   track checked-in mobile wireless communications devices based upon RFID communication with said at least one RFID sensor, and
   send at least one reservation expiration notification for at least one meeting room occupant based upon a reserved ending time and a subsequent check-in of another mobile wireless communications device.

2. The meeting room reservation system of claim 1 wherein said reservation server is configured to send the at least one reservation expiration notification within a threshold period of the reserved ending time.

3. The meeting room reservation system of claim 1 wherein said reservation server is configured to send a plurality of reservation expiration notifications at an increasing frequency.

4. The meeting room reservation system of claim 1 wherein said reservation server is configured to schedule the reserved starting and ending times via RFID communication between said mobile wireless communications devices and said at least one RFID sensor.

5. The meeting room reservation system of claim 1 wherein said reservation server is further configured to cancel reserved starting and ending times based upon a failure of at least one associated mobile wireless communications device to check in for reserved starting times.

6. The meeting room reservation system of claim 1 wherein said reservation server is further configured to send an availability notification based upon checkout of the checked-in mobile wireless communications device.

7. The meeting room reservation system of claim 1 further comprising a terminal to be positioned in the meeting room; and wherein said reservation server is further configured to send the at least one reservation expiration notification to said terminal.

8. The meeting room reservation system of claim 7 wherein said terminal comprises a display, and wherein said display is configured to display the at least one reservation expiration notification.

9. The meeting room reservation system of claim 7 wherein said terminal and said reservation server communicate via a local area network (LAN).

10. The meeting room reservation system of claim 1 wherein said other mobile wireless communications device has a subsequent reserved starting time associated therewith.

11. The meeting room reservation system of claim 1 wherein said at least one RFID sensor comprises at least one NFC sensor.

12. The meeting room reservation system of claim 1 wherein the at least one reservation expiration notification comprises at least one electronic mail (email) notification.

13. A resource reservation system comprising:
    at least one radio frequency identification (RFID) sensor to be associated with the resource;
    a plurality of mobile wireless communications devices, each configured for RFID communication with said at least one RFID sensor; and
    a reservation server configured to
    schedule reserved starting and ending times for the resource,
    track checked-in mobile wireless communications devices based upon RFID communication with said at least one RFID sensor, and
    send at least one reservation expiration notification for at least one current resource user based upon a reserved ending time and a subsequent check-in of another mobile wireless communications device.

14. The resource reservation system of claim 13 wherein said reservation server is configured to send the at least one reservation expiration notification within a threshold period of the reserved ending time.

15. The resource reservation system of claim 13 wherein said reservation server is configured to send a plurality of reservation expiration notifications at an increasing frequency.

16. The resource reservation system of claim 13 wherein said reservation server is configured to schedule the reserved starting and ending times via RFID communication between said mobile wireless communications devices and said at least one RFID sensor.

17. A reservation server for use with at least one radio frequency identification (RFID) sensor to be associated with a meeting room and a plurality of mobile wireless communications devices each configured for RFID communication with the at least one RFID sensor, the reservation server comprising:
- a scheduling module configured to schedule reserved starting and ending times for the meeting room; and
- a check-in module configured to track checked-in mobile wireless communications devices based upon RFID communication with said at least one RFID sensor;
- said scheduling module further configured to send at least one reservation expiration notification for at least one meeting room occupant based upon a reserved ending time and a subsequent check-in of another mobile wireless communications device.

18. The reservation server of claim 17 wherein said scheduling module is configured to send the at least one reservation expiration notification within a threshold period of the reserved ending time.

19. The reservation server of claim 17 wherein said scheduling module is configured to send a plurality of reservation expiration notifications at an increasing frequency.

20. The reservation server of claim 17 wherein said scheduling module is configured to schedule the reserved starting and ending times via RFID communication between the mobile wireless communications devices and said at least one RFID sensor.

21. A meeting room reservation method comprising:
- scheduling reserved starting and ending times for a meeting room with a reservation server;
- tracking checked-in mobile wireless communications devices with the reservation server based upon radio frequency identification (RFID) communication between the mobile wireless communications devices and at least one RFID sensor associated with the meeting room; and
- sending at least one reservation expiration notification for at least one meeting room occupant from the reservation server based upon a reserved ending time and a subsequent check-in of another mobile wireless communications device.

22. The method of claim 21 wherein sending comprises sending the at least one reservation expiration notification within a threshold period of the reserved ending time.

23. The method of claim 21 wherein sending comprises sending a plurality of reservation expiration notifications at an increasing frequency.

24. The method of claim 21 wherein scheduling comprises scheduling the reserved starting and ending times based upon RFID communication between respective mobile wireless communications devices and the at least one RFID sensor.

25. The method of claim 21 further comprising canceling reserved starting and ending times with the reservation server based upon a failure of associated mobile wireless communications devices to check in.

26. A mobile wireless communications device to cooperate with a reservation server and a radio frequency identification (RFID) sensor associated with a meeting room, the reservation server configured to schedule reserved starting and ending times for the meeting room, track checked-in mobile wireless communications devices based upon RFID communication with the RFID sensor, and send at least one reservation expiration notification based upon a reserved ending time and a subsequent check in of another mobile wireless communications device, the mobile wireless communications device comprising:
- a processor and a memory coupled thereto and configured to check in with the reservation server via the at least one RFID sensor, and
- receive the at least one reservation expiration notification from the reservation server based upon the reserved ending time and the subsequent check-in of the another mobile wireless communications device.

27. The mobile wireless communications device of claim 26 wherein the processor and memory are configured to receive the at least one reservation expiration notification sent from the reservation server within a threshold period of the reserved ending time.

28. The mobile wireless communications device of claim 26 wherein the processor and memory are configured to receive a plurality of reservation expiration notifications sent from the reservation server at an increasing frequency.

29. The mobile wireless communications device of claim 26 wherein the processor and memory are configured to schedule the reserved starting and ending times via RFID communication with the RFID sensor.

30. The mobile wireless communications device of claim 26 further comprising at least one wireless transceiver coupled to said processor.

* * * * *